Figure 1:
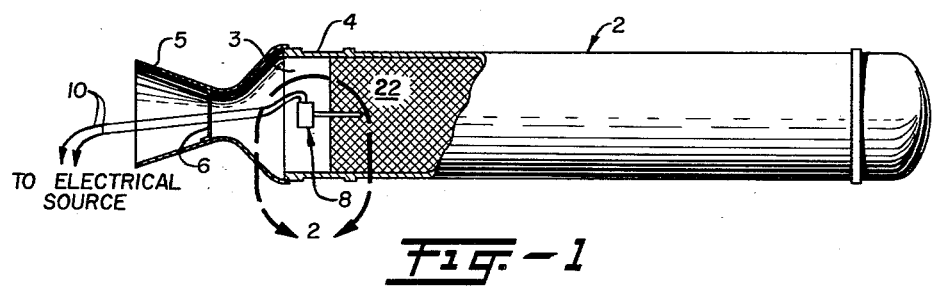

July 17, 1962  E. A. EASTON  3,044,399
IGNITER FOR SOLID PROPELLANTS
Filed Aug. 4, 1958

INVENTOR.
EDWARD A. EASTON
BY
ATTORNEY

United States Patent Office 3,044,399
Patented July 17, 1962

3,044,399
IGNITER FOR SOLID PROPELLANTS
Edward A. Easton, La Puente, Calif., assignor to Aerojet-General Corporation, Azusa, Calif., a corporation of Ohio
Filed Aug. 4, 1958, Ser. No. 752,982
6 Claims. (Cl. 102—70)

This invention relates to ignition systems generally, and in particular to systems for igniting solid propellants.

To achieve reliable ignition of a solid propellant grain it is necessary to sustain a hot flame on at least one of the surfaces to be ignited for an extended period of time. Where combustion of the flame-producing ignition material takes place within the environment of a confined chamber, the pressure within the chamber will rapidly mount as combustion proceeds. If pressure-sensitive ignition material is employed, that is, one in which the burning rate increases as the environmental pressure increases, the ignition material may be consumed before the main propellant grain is reliably burning. Also, if an igniter material is employed which yields primarily gaseous products of combustion, reliable ignition of the propellant may be lacking due to insufficient exposure to a hot flame.

It is therefore the principal object of the present invention to provide an improved means for and a novel method of igniting a solid propellant.

Another object of the present invention is to provide an improved solid propellant ignition system which is unaffected by pressure changes within the combustion chamber.

Still another object of the present invention is to provide an improved means for and novel method of exposing a solid propellant grain to an ignition flame for an optimum period of time.

In its principal aspect the ignition system of the present invention employs a "powder train," an element of which is inserted in close-fitting relationship within at least one surface of the propellant grain itself so as to provide adequate exposure of the grain to the ignition flame to insure continued burning. In a preferred embodiment a plurality of small perforated cylinders of a first ignition material are strung upon an electrically actuated heating element in the form of a wire and this assembly is mounted within a cavity in a larger charge of a second ignition material. The second ignition material is in close physical proximity to a wire coated with a pyrotechnic mixture, a portion of which is inserted into a hole within the desired burning surface of solid propellant grain. Electrical energization of the starter wire ignites the pellets strung thereon which in turn ignite the second material. The flames of combustion from the second material cause a rapid burning of the pyrotechnic coating. As that portion of the pyrotechnic coating on the wire embedded within the propellant grain is caused to burn, hot particles are ejected on to the surfaces of the hole within the propellant grain. The burning proceeds even further along the wire and the hot gases of combustion pass along the walls of the hole to the chamber further heating the grain burning surface and thereby further insuring continued combustion.

Figure 2:
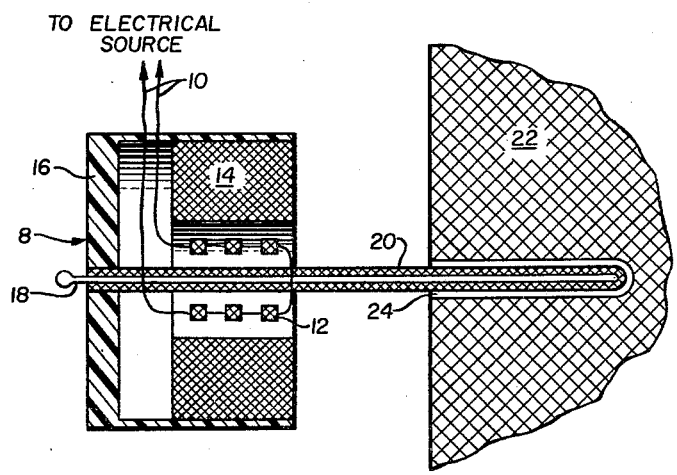

These and other objects, aspects, features, and advantages of the invention will be apparent to those skilled in the art from the following, more detailed, description taken in conjunction with the appended drawings wherein:

FIGURE 1 is a partial cross-sectional view of the igniter system of the present invention employed in conjunction with a solid propellant rocket motor; and FIGURE 2 is a vertical cross-section of the igniter as arranged with a propellant grain adapted for end or "cigarette" type burning in the rocket motor of FIGURE 1.

Reference is made to FIGURE 1 which shows a solid propellant grain 22 arranged within the chamber 3 of a rocket motor 2 having a casing 4 and an exhaust nozzle 5. The electrically actuated igniter 8 of the present invention is also arranged within the chamber 3 in close-fitting relationship to the propellant grain 22. The electrical wires 10 connecting the igniter 8 to an appropriate source of electrical energy, not shown, pass through a frangible diaphragm 6, which is designed to rupture when the pressure within the chamber 3 is above a predetermined level. Actuation of the igniter 8 by application of electrical energy to the connecting wires 10 will cause end burning of the propellant grain 22. When the resulting pressure within the chamber 3 is sufficiently high, the frangible diaphragm 6 will rupture, allowing passage of the hot gaseous products of combustion through the nozzle 5 to provide a forward propulsive motion to the rocket motor 2. Alternatively, the igniter 8 may be mounted in the forward surface of the propellant grain 22 if adequate spacing is provided between the casing 4 and the grain 22 to allow egress of the gases from the forward end along the grain 22 to the nozzle 5.

The construction of the ignition system and its relation to the propellant grain 22 are illustrated in more detail in FIGURE 2. Small, perforated cylinders or pellets of a first ignition material 12 are strung on an igniter wire 10 which is connected to an external source of electrical energy, not shown. The igniter wire 10 may be of any material that will generate sufficient heat in response to a current flow therethrough. The first ignition material 12 is a self-sustaining propellant material such as nitrocellulose-nitroglycerine or black powder characterized by activation in response to heat and having a combustion temperature of at least 3000 degrees Fahrenheit. In operation a Nichrome wire having a resistance of approximately seven (7) ohms per foot and connected to a 28 volt direct current source was used to ignite pellets composed of nitrocellulose-nitroglycerine. The wire-pellet assembly is arranged within a cavity in a second ignition material 14 so the flame resulting from ignition of the first material 12 will be directed to a maximum burning surface area of the second material 14. The second ignition material 14 is a composite solid propellant material having an ignition temperature below the combustion temperature of said self-sustaining propellant material 12 and a combustion temperature from about 4000 to 7000 degrees Fahrenheit. Typical propellants of this nature are described in U.S. Patent No. 2,563,265 issued August 7, 1951, to John W. Parsons and assigned to the Aerojet-General Corporation of Azusa, California, as well as in presently copending applications Serial Number 109,409, filed August 9, 1949; Serial Number 175,397, filed July 22, 1950; Serial Number 209,507, filed February 5, 1951; and Serial Number 321,941, filed November 21, 1952, now abandoned, all assigned to the Aerojet-General Corporation of Azusa, California. Ammonium perchlorate oxidizer and fuel and binder composed of poly methyl methacrylate, methyl methacrylate, and ethyl acrylate may be used as the second material 14. The mixture may be fabricated in the shape of a tube as shown. The second material 14 is held within a retaining assembly 16 which also provides support for a wire 18 which is coated with a pyrotechnic mixture 20, and extends into a hole 24 within one surface of the solid propellant grain 22. The retaining assembly 16 may be constructed of Micarta or some other similarly rigid and heat-resistant material. The wire 18 may be coated with a pyrotechnic mixture 20 of barium nitrate, aluminum powder, and iron filings with dextrin added as a binder. Other conventional pyrotechnic compositions may be employed such as Thermit or other mixtures of finely divided metal and oxidizing salt such as aluminum and potassium perchlorate.

In operation, an electrical current is passed through the starter wire 10 igniting the first material pellets 12, which in turn ignite a larger area of inner surface of the second material 14. Flames radiating from the burning surfaces of the second material 14 ignite the pyrotechnic mixture 20 coated upon the wire 18. Burning will proceed along the pyrotechnic coating 20 and reach that portion of the wire 18 which is inserted in the hole 24 within the propellant grain 22. As the pyrotechnic mixture 20 burns, it ejects hot particles which impinge on the surfaces of the hole 24 surrounding the wire 18. Further, the hot gaseous products of combustion will tend to escape to the chamber and in so doing, pass those wall surfaces of the hole 24 that have been exposed previously to the hot particles of pyrotechnic mixture 20. As a result the propellant grain 22 is further raised in temperature, thereby insuring reliable burning. It is desirable that the fit between the coated wire 18 and the propellant grain 22 not be too snug. In practice a clearance of at least $1/16$ of an inch is preferably employed in order to insure easy passage of the hot gases of combustion past the wall surfaces of the hole 24. With a composition propellant grain of approximately 15 inches in length satisfactory and reliable ignition can be obtained in all firings wherein the hole 24 within the propellant grain 22 is between ½ and 1 inch below the surface. Such a grain, for example, comprises ammonium nitrate oxidizer and fuel and binder including poly methyl methacrylate, methyl methacrylate, and ethyl acrylate.

It is possible to vary the configuration of the "powder train" without affecting the results, providing the pyrotechnic wire 18 is inserted into the hole 24 of the propellant grain 22 as described above. For example, the starter wire 10 may be directly affixed to the pyrotechnic mixture 20 of the wire 18, dispensing with the first ignition material 12 and second ignition material 14. Alternatively, the starter wire 10 could be directly affixed to the inner burning surface of the second ignition material 14, thereby dispensing with the first material 12.

What has been shown is an ignition system for propellants heretofore found difficult to ignite, which is operable over a wide range of pressures and is particularly adapted for use where ignition is to take place within a confined chamber. It will be obvious that there are many possible configurations of apparatus which will bring about the results described so long as the general conditions set forth are observed. For example, the apparatus of the present invention is particularly well suited for drilling operations where ignition of propellant activating a mechanical means must take place within a confined chamber remotely located from the control means. It is to be understood that the form of the invention herewith described is to be taken as a preferred example of the same, and that various changes in the shape, size and arrangement of the parts may be resorted to without departing from the spirit of the invention and of the scope of the appended claims.

What is claimed is:

1. An igniter for a solid propellant grain provided with a hole in one surface thereof, comprising: a Nichrome wire, a plurality of nitrocellulose-nitroglycerine pellets strung on said wire, a tubular charge having a longitudinal cavity therethrough and comprising composite propellants having an ammonium perchlorate oxidizer, said Nichrome wire being arranged within said cavity of said tubular charge, a second wire, a pyrotechnic mixture consisting of barium nitrate, aluminum powder, and iron filings with a dextrin binder coated upon the outer surface of said second wire, said coated second wire having a diameter slightly less than that of the hole in the propellant grain surface and extending through the cavity of said tubular charge and into said hole in the solid propellant grain, said coated wire being spaced apart from the grain surface defining said hole for a portion of the periphery of said wire.

2. A solid propellant ignition system comprising, a heat resistant cylindrical housing, a composite solid propellant material snugly fitted within said housing and having a central axial cavity therethrough, an electrically actuated heating element, a plurality of units of self-sustaining propellant material arranged in immediate physical contact with said heating element, and a member coated with a pyrotechnic mixture secured by said housing and centrally extending through said cylindrical cavity, said heating element and self-sustaining propellant material being positioned within said housing between said pyrotechnic coated member and the walls of the central axial cavity of said composite solid propellant material.

3. An igniter for solid propellants comprising: a heat generating electrical resistance element, a plurality of pellets of a first ignitable material strung upon said resistance element, a second ignitable material having a central cavity therethrough, a member coated with a pyrotechnic mixture, said second ignitable material central cavity being of sufficient volume to internally receive said resistance element and said coated member, said coated member being centrally positioned within said cavity, and said resistance element being positioned within said cavity between said coated member and the inner surface wall of said cavity.

4. A device as in claim 3 wherein said first ignitable material is a self-sustaining propellant material.

5. A device as in claim 3 wherein said second ignitable material is a composite solid propellant material.

6. An ignition system as set forth in claim 2 wherein said self-sustaining propellant material has a combustion temperature of at least 3,000° F., and said composite solid propellant material has an ignition temperature below the combustion temperature of said self-sustaining propellant material and a combustion temperature from about 4,000° F. to 7,000° F.

References Cited in the file of this patent

UNITED STATES PATENTS

| | | |
|---|---|---|
| 2,434,652 | Hickman | Jan. 20, 1948 |
| 2,459,163 | Hickman | Jan. 18, 1949 |
| 2,545,496 | Short | Mar. 20, 1951 |
| 2,620,732 | Hickman | Dec. 9, 1952 |
| 2,681,701 | Schlumberger | June 22, 1954 |
| 2,697,325 | Spaulding | Dec. 21, 1954 |
| 2,743,580 | Loeb | May 1, 1956 |
| 2,773,448 | Jasse | Dec. 11, 1956 |
| 2,799,987 | Chandler | July 23, 1957 |